United States Patent [19]

Genereaux et al.

[11] Patent Number: 4,696,460
[45] Date of Patent: Sep. 29, 1987

[54] CLAMPING APPARATUS

[76] Inventors: Eugene P. Genereaux, 7837 S. Forest St., Littleton, Colo. 80122; Samuel M. Jameson, 834 S. Tejon St.; Timothy K. Brooks, 852 S. Raritan St., both of Denver, Colo. 80223

[21] Appl. No.: 884,484

[22] Filed: Jul. 11, 1986

[51] Int. Cl.⁴ .............................................. B23Q 1/04
[52] U.S. Cl. .......................................... 269/6; 269/41; 269/164; 269/238; 269/258
[58] Field of Search ................. 81/420, 424, 427, 418; 269/6, 41, 43, 45, 228, 238, 258, 164, 307

[56] References Cited

U.S. PATENT DOCUMENTS

| | | | |
|---|---|---|---|
| 1,497,107 | 6/1924 | Lasell | 269/164 |
| 2,815,777 | 12/1957 | Iraids . | |
| 2,941,557 | 6/1960 | Baprawski | 269/41 |
| 3,195,382 | 7/1965 | Rommel et al. . | |
| 3,195,387 | 7/1965 | Telfer . | |
| 3,202,023 | 8/1965 | Parker . | |
| 3,263,535 | 8/1966 | Zürcher . | |
| 3,653,284 | 4/1972 | Pynchon et al. . | |
| 3,779,108 | 12/1973 | Reiter . | |
| 3,984,092 | 10/1976 | Fitzpatrick . | |
| 4,238,123 | 12/1980 | Bardes . | |
| 4,299,146 | 11/1981 | Phelps | 269/258 |
| 4,305,575 | 12/1981 | Bardes . | |
| 4,363,475 | 12/1982 | McCarty | 269/164 |
| 4,369,957 | 1/1983 | Williams | 269/164 |
| 4,378,937 | 4/1983 | Dearman . | |
| 4,475,728 | 10/1984 | Haddad . | |
| 4,483,059 | 11/1984 | Dearman . | |
| 4,553,305 | 11/1985 | Dearman . | |

FOREIGN PATENT DOCUMENTS

2836506 3/1980 Fed. Rep. of Germany ........ 269/41

Primary Examiner—Robert C. Watson
Attorney, Agent, or Firm—Klaas & Law

[57] ABSTRACT

A clamping device is provided with holding means on each of a first and second jaw means for positioning at least two workpieces of different thicknesses together in any desired abutting angular relationship and means for applying a force to the jaw means so that the holding means will hold the workpieces of different thicknesses in the abutting angular relationship.

20 Claims, 13 Drawing Figures

CLAMPING APPARATUS

FIELD OF THE INVENTION

This invention relates generally to the field of clamping devices which are used to hold workpieces in a desired relationship and more particularly to a clamping apparatus which can be used to hold workpieces in any desired relationship including workpieces having different thicknesses or shapes in any desired angular relationship.

BACKGROUND OF THE INVENTION

In many instances, it is desirable to hold two workpieces together in angular relationship for purposes of nailing, gluing, welding or temporarily holding for fabrication purposes. There have been many different types of apparatus for this use. Fabricators have build different kinds of jigs and fixtures for holding workpieces together in a desired angular relationship. If two workpieces are being held in a desired angular relationship for an arc welding operation, the holding means must be strong enough to withstand the force applied to loosen a stuck electrode. Also, when using a solvent adhesive to join two workpieces of a plastic material, it is essential that there be no relative movement between the workpieces after the solvent adhesive has been applied. The problems associated with holding two workpieces together in a desired angular relationship are magnified when the workpieces are of different thicknesses and/or shapes. Also additional problems arise when the angular relationship varies in accordance with the desired work to be performed. Therefore, there exists a need for a relatively simple and inexpensive apparatus that will readily hold two workpieces of different thicknesses and/or shape together at any desired angular relationship and at any desired location.

BRIEF DESCRIPTION OF THE INVENTION

This invention provides apparatus having holding means secured to a first and second jaw means of a conventional clamping means so that two workpieces of different thicknesses may be held together in an abutting angular relationship. This is accomplished by connecting a portion of the holding means to one of the jaw means so that the portion of the holding means will have both pivotal movement about a transverse axis and linear movement in each direction along the transverse axis. The invention also provides means to vary the angular relationship at which the workpieces are held. In a different embodiment, the invention provides means so that the workpieces may be secured togeher at various locations.

In one embodiment of the invention, the clamping apparatus comprises a pair of handles having first and second jaw means connected thereto and with first pivot means located between the pair of handles and the first and second jaw means for pivotally connecting the pair of handles and the first and second jaw means for pivotal movement around a first pivot axis. The pair of handles and the first and second jaw means have generally parallel longitudinal axes. Holding means are provided on the first and second jaw means for holding two workpieces together in an abutting angular relationship. The first portion of the holding means on the first jaw means comprises a first pair of elongated spaced apart members having relatively planar facing surfaces at a predetermined angular relationship so that workpieces position in contact with these surfaces will be at the same angular relationship. The second portion of the holding means on the second jaw means comprises a second pair of elongated spaced apart members having facing surfaces for contacting each of the workpieces. Second pivot means are provided for pivotally connecting the second pair of spaced apart elongated members to the second jaw means for pivotal movement about a second pivot axis that is transverse to the longitudinal axis of the second jaw means. Also, means are provided for permitting linear movement of the second portion of the holding means in each direction along the second pivot axis.

In some embodiments of the invention means are provided for varying the angular relationship between the first pair of spaced apart elongated members. In these embodiments of the invention, each of the second pair of elongated spaced apart members is pivotally connected to the second pivot means for pivotal movement about a longitudinal axis which is generally parallel to the longitudinal axis of the second jaw means.

The invention also provides means so that a workpiece may be held in a desired relationship at any location along another elongated workpiece. In this embodiment, the first and second pairs of elongated spaced apart members are pivotally connected to the first and second jaw means for pivotal movement about an axis that is perpendicular to the longitudinal and transverse axes of the first and second jaw means. This structure permits each of the first and second pairs of elongated spaced apart members to have any desired angular relationship with the longitudinal axis of the associated one of the first and second jaw means. Therefore, the workpieces may be held together at different locations along their edges.

It is an object of this invention to provide a clamping apparatus for holding at least two workpieces of different thicknesses and or shapes together in an abutting angular relationship.

In is another object of this invention to provide a clamping apparatus for holding at least two workpieces of different thicknesses and/or shapes together in any desired abutting angular relationship.

It is a further object of this invention to provide a clamping apparatus for holding at least two workpieces of different thicknesses and/or shapes together in any desired abutting angular relationship and at any location along their edges.

It is a further object of this invention to provide a clamping apparatus for holding at least two workpieces in any desired abutting angular relationship at any location along their edges.

Additional objects, advantages, and novel features of the invention are set forth in part in the description which follows which will be understood by those skilled in the art upon examination of the following or may be learned by practice of the invention. The objects and advantages of the invention may be realized and obtained by means of hte instrumentalities and combinations particularly pointed out in the appended claims.

DETAILED DESCRIPTION OF THE INVENTION

Figures 1, 2, 3, 4:
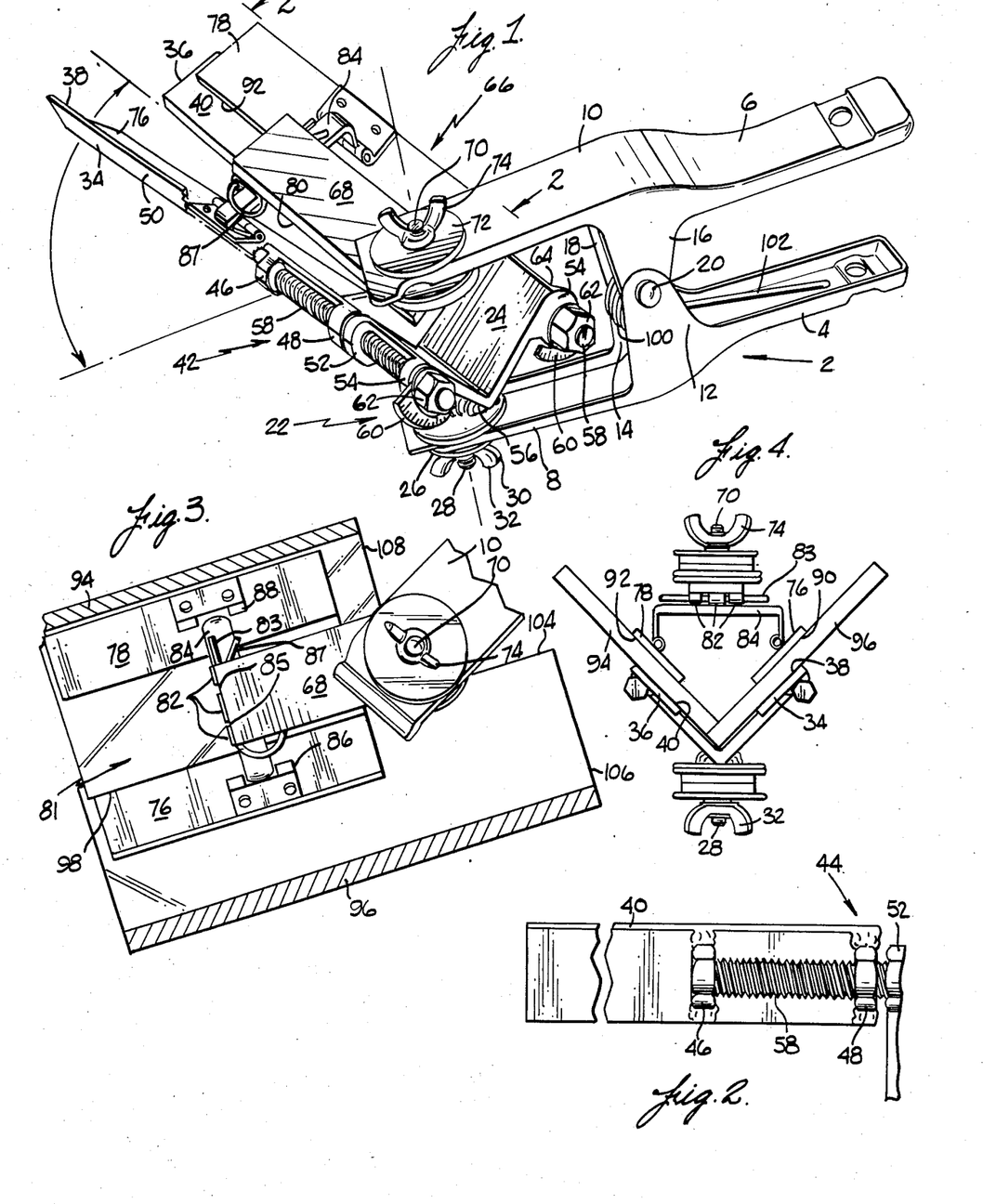
FIG. 1 is a pictorial view of a preferred embodiment of the invention.
FIG. 2 is a side elevational view taken along line 3—3 of FIG. 1 of a portion of the clamping apparatus.
FIG. 3 is a view of a portion of the clamping apparatus holding two workpieces in an angular relationship.
FIG. 4 is an end view of FIG. 3.

A preferred embodiment of a clamping apparatus 2 of this invention is illustrated in FIGS. 1 and 2 and comprises a pair of handles 4 and 6 having a first jaw means 8 integral with the handle 4 and a second jaw means 10 integral with the handle 6. As viewed in FIG. 1, a pair of spaced apart projection 12 and 14 extend upwardly from handle 4 and first jaw means 8 and are integral therewith and a pair of spaced apart projections 16 and 18 extend downwardly from handle 6 and second jaw means 10. Pivot means 20 pivotally connect the projections 12, 14, 16 and 18 so that handle 4 and first jaw means 8 and handle 6 and second jaw means 10 pivot around the axis of the pivot means 20. Handles 4 and 6 and first and second jaw means 8 and 10 have generally parallel longitudinal axes which are perpendicular to the axis of the pivot means 20.

A first part 22 of the holding means comprises a generally V-shaped support plate 24 mounted on a generally circular plate 26 which is pivotally mounted on the first jaw means 8 by a pivot pin 28 secured to the V-shaped support plate 24. The axis of the pivot pin 28 is generally perpendicular to the axis of the pivot pin 20 and the longitudinal axes of the handle 4 and the first jaw means 8. A washer 30 and a wing nut 32 are used to lock the V-shaped support plate 24 in a desired position. A first pair of elongated spaced apart members 34 and 36 having generally planar surfaces 38 and 40 extend outwardly in a longitudinal direction from the V-shaped support plate 24. The elongated spaced apart members 34 and 36 are generally rectangular in shape and extend in a longitudinal direction a greater distance than in the transverse direction. Each of the elongated spaced members 34 and 36 are pivotally mounted on the V-shaped support plate 24 by pivot means 42 and 44 illustrated in FIGS. 1 and 2. The pivot means 42 comprises a pair of spaced apart threaded nuts 46 and 48 secured to the back surface 50 of the member 34 by suitable means such as by welding. A pair of spaced apart threaded nuts 52 and 54 are secured to the back surface 56 of the V-shaped support plate 24 by suitable means, such as by welding. A threaded bolt 58 is threadedly connected in the threaded nuts 46, 48, 52 and 54 and projects outwardly from the threaded nut 54 in a longitudinal direction. Scale means 60 are provided so as to indicate the angular variation of the planar surface 38 of the member 34 from a set point. A lock nut 62 is provided to hold the planar surface 38 of the member 34 at a desired angular relationship. The member 36 is pivotally mounted on the back surface 64 of the V-shaped support plate. The pivot means 44 have parts corresponding to the pivot means 42 and have been given corresponding reference numerals in FIG. 2. It is understood that the pivot means 42 and 44 are used for illustration purposes only and that other pivot means can be used to provide a pivotal mounting for the elongated spaced apart members 34 and 36. The axes of the pivot means 42 and 44 are generally parallel to the longitudinal axes of the elongated spaced apart members 34 and 36.

A second part 66 of the holding means comprises a generally rectangular support plate 68 which is pivotally mounted on the second jaw means 10 by a pivot pin 70 secured to the rectangular support plate 68. The axis of the pivot pin 70 is generally perpendicular to the axis of the pivot pin 20 and the longitudinal axis of the handle 6 and the second jaw means 10. A washer 72 and a wing nut 74 are used to lock the rectangular support plate 68 in a desired position. A second pair of elongated spaced apart members 76 and 78 are generally rectangular in shape and extend in the longitudinal direction a greater distance than in the transverse direction. The longitudinal axes of the elongated spaced apart members 76 and 78 are generally parallel to the longitudinal axes of the elongated spaced apart members 34 and 36 when the clamping apparatus 2 is being used as described below. The elongated spaced apart members 76 and 78 are pivotally mounted on the bottom surface 80 of the support plate 68 by a common pivot means 81 comprising a plurality of hinges 82 having a pivot rod 83 extending therethrough. The axis of the pivot means 81 is transverse to the longitudinal axes of the elongated spaced apart members 76 and 78. At least one of the hinges 82 is mounted on a U-shaped bar 84. Spaces 85 between the hinges 82 permit the U-shaped bar to have linear movement in each direction along the pivot rod 83. The pivot rod 83 in held in position by an integral spring clip 87. Other types of pivot means may be used as long as they also provide for the linear movement in each direction along the pivot axis. The elongated member 76 is pivotally mounted on the U-shaped bar 84 by a pivot means 86 and the elongated member 78 is pivotally mounted on a U-shaped bar 84 by the pivot means 88, illustrated as a hinge connection but not limited thereto since other types of pivot means can be used. The axes of the pivot means 86 and 88 are generally parallel to the longitudinal axes of the elongated spaced apart members 76 and 78. The elongated spaced apart members 76 and 78 have planar surfaces 90 and 92 for contacting the workpieces as explained below.

One of the many uses of the clamping apparatus 2 is illustrated in FIG. 4 for holding a relatively thin workpiece 94 and a relatively thick workpiece 96 in a desired angular relationship and at a desired location along the edge 98 of the relatively thin workpiece 94. A coiled spring 100 having arms 102 bearing against the inner surfaces of the handles 4 and 6 functions to urge the first and second jaw means 8 and 10 together. The lock nuts 62 are loosened and the elongated spaced apart members 34 and 36 are pivoted around the pivot means 42 and 44 until the desired angular relationship between the planar surfaces 38 and 40 is obtained. The lock nuts 62 are tightened to hold the planar surfaces at the desired angular relationship. The wing nuts 32 and 74 are slightly loosened and pressure is applied to the handles 4 and 6 to act against the force of the coiled spring 100 and move the first and second jaw means 8 and 10 apart. The elongated spaced apart members 34, 36, 76 and 78 are rotated about the pivot pins 28 and 70 until the desired angular relationship between the longitudinal axes of the first and second jaw means 8 and 10 and the longitudinal axes of the elongated spaced apart members 34, 36, 76 and 78 is obtained. The pressure is released and the first and second jaw means 8 and 10 are urged by the coiled spring 100 to the closed position. The wing nuts 332 and 74 are then tightened. Pressure is again applied to the handles 4 and 6 so as to move the planar surfaces 40 and 92 apart a distance greater than the thickness of the relatively thin workpieces 94. The planar surfaces 40 and 92 are moved over the edge 98 until they are in a desired location relative to the relatively thin workpiece 94. The pressure is continued to be applied to the handles 4 and 6 until the planar surfaces 38 and 90 have moved apart a distance greater than the thickness of the relatively thick workpiece 96. The planar surfaces 38 and 90 are moved over the edge 104 of the relatively thick workpiece 96 until they are in a desired location relative to the relatively thick workpiece 96. The pressure being applied to the handles 4 and 6 is removed and the coiled spring 100 moves the first and second jaw means 8 and 10 toward each other. The planar surfaces 38 and 90 move toward each other. The initial contact between the planar surface 90 and workpiece 96 causes the elongated spaced apart members 76 and 78 to pivot around the pivot rod 83 until it is in a position generally parallel to the planar surface 38. The movement is continued until the relatively thick workpiece 96 is firmly clamped between the planar surfaces 38 and 90. The planar surfaces 40 and 92 continue to move toward each other until the relatively thin workpiece 94 is firmly clamped therebetween. During the continued movement of the planar surfaces 40 and 92, the U-shaped bar 84 slides along the pivot rod 83 to accommodate the differences in thickness between the workpieces 94 and 96. The advantage obtained by the pivotal movement around the pivot pins 28 and 70 is illustrated in FIG. 3. If the longitudinal axes of the handles 4 and 6 and the first and second jaw means 8 and 10 and the elongated spaced apart members 34, 36, 76 and 78 are parallel and the distance between the edge 106 of the relatively thick workpiece 96 and the edge 108 of the relatively thin workpiece 94 is greater than the distance between about the midpoint of the elongated spaced apart members 34, 36, 76 and 78 and the projections 12, 14, 16 and 18, the clamping apparatus 2 could not be applied.

It is understood that the advantages obtained by the pivotal movement around the pivot pins 28 and 70 may be used in clamping apparatus that is not provided with means for permitting the linear movement of the U-shaped bar 84 along the pivot rod 83 or any means permitting such movement. Also, by changing the shape of the first and second jaw means 8 and 10, and locating the pivot pins 28 and 70 at the centers of the elongated members 34, 36, 76 and 78, pivotal movement of 360 degree can be obtained.

Another embodiment of the clamping apparatus 2 of this invention is illustrated in FIGS. 5–8 and comprises a pair of handles 110 and 112 having a first jaw means 114 integral with the handle 110 and a second jaw means 116 integral with the handle 112. As viewed in FIG. 5, a pair of spaced apart projections 118 and 120 extend upwardly from the handle 110 and a pair of spaced apart projections 122 and 124 extend downwardly from the handle 112. Pivot means 126 pivotally connect the projections 118, 120, 122 and 124 so that the handle 110 and first jaw means 114 and the handle 112 and second jaw means 116 pivot around the pivot means 126. Handles 110 and 112 and first and second jaw means 114 and 116 have generally parallel longitudinal axes which are perpendicular to the axis of the pivot means 126.

Figures 5, 6, 8:
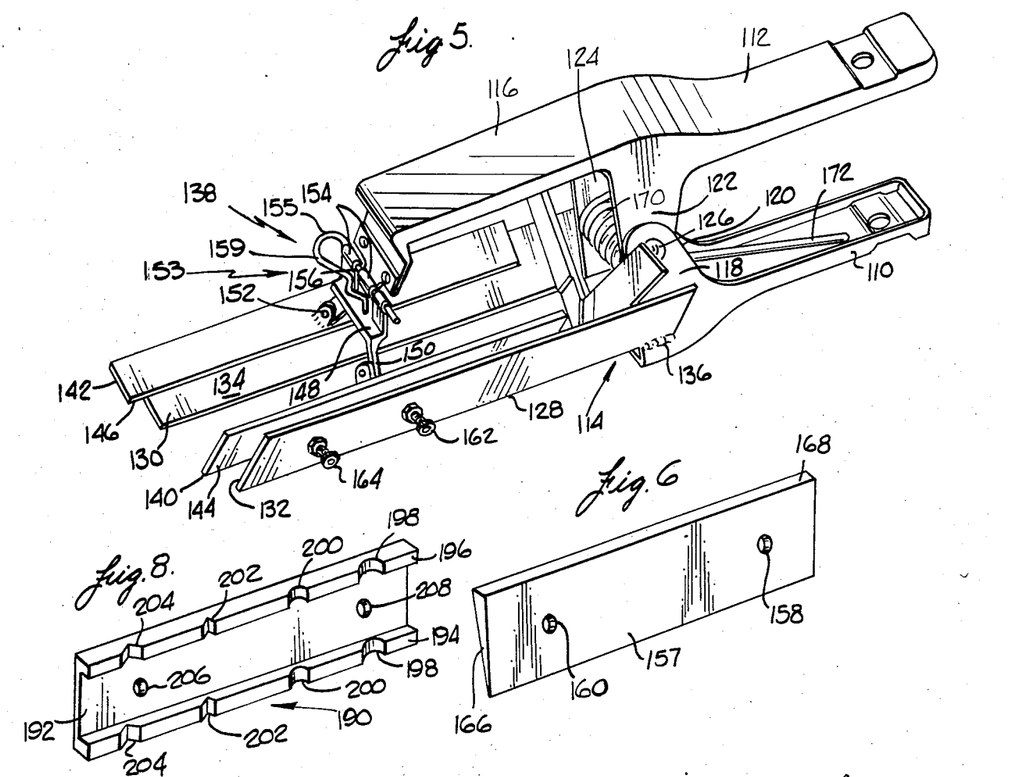
FIG. 5 is a pictorial view of another embodiment of the invention.
FIG. 6 is a pictorial view of a tapered shim plate.
FIG. 8 is a pictorial view of a holding plate.

The first jaw means 114 provide the first part of the holding means which comprises a fist pair of elongated spaced apart members 128 and 130 having generally planar surfaces 132 and 134 extend outwardly in a longitudinal direction from the handle 112. The elongated spaced apart members 128 and 130 are generally rectangular in shape and extend in a longitudinal direction a greater distance than in the transverse direction. The elongated spaced apart members 128 and 130 can be formed integral with the handle 110 or may be secured thereto by suitable means such as by welding 136. The planar surfaces 132 and 134 are at a fixed relative angular relationship which in the embodiment illustrated in FIG. 5 is 90 degree. However, other fixed angular relationships may be utilized if desired.

A second part 138 of the holding means comprises a second pair of elongated spaced apart members 140 and 142 having generally planar surfaces 144 and 146 and have longitudinal axes generally parallel to the longitudinal axes of the elongated spaced apart members 128 and 130. The elongated members 140 and 142 are generally rectangular in shape and extend in a longitudinal direction a greater distance than in the transverse direction. The elongated member 140 is secured to a U-shaped bar 148 by a pivot means 150 and the elongated member 142 is secured to the U-shaped bar 148 by pivot means 152. The axes of the pivot means 150 and 152 are parallel to the longitudinal axes of the elongated spaced apart members 128, 130, 140 and 142. The U-shaped bar 148 is pivotally connected to the second jaw means 116 by a pivot means 153 wherein the axis of the pivot means 153 is transverse to the longitudinal axes of the elongated spaced apart members 128, 130, 140 and 142. The pivot means 153 comprises a plurality of hinges 154 having a pivot rod 155 extending therethrough. At least one of the hinges 154 is secured to the U-shaped bar 148. Spaces 156 between the hinges 154 permit the U-shaped bar 148 to have linear movement in each direction along the pivot rod 155. The pivot rod 155 is held in position by an integral spring clip 159. The angular relationship between the planar surfaces 132 and 134 may be varied by the use of a tapered shim plate 157, illustrated in FIG. 6. The tapered shim plate 157 has a pair of spaced apart threaded openings 158 and 160. Two threaded bolts 162 and 164 are used to secure the tapered shim plate in contact with the planar surface 132. The tapered shim plate 157 has a planar surface 166. Similar arrangements can be made for the elongated member 130.

Figure 7:
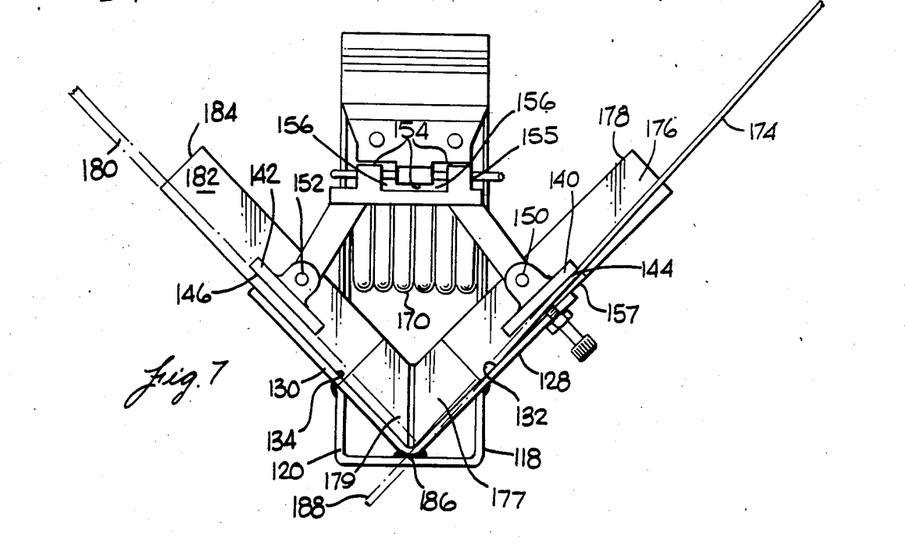
FIG. 7 is an end view of the clamping apparatus holding two workpieces in an angular relationship.

One of the many uses of the clamping apparatus 2 of FIG. 5 is illustrated in FIG. 7. A tapered shim plate 157 has been attached to the elongated member 128 with the relatively thick edge 168 in an upper location so as to reduce the included angle between the planar surfaces 132 and 134. If the included angle between the planar surfaces 132 and 134 is to be increased, the tapered shim plate 156 is attached to the elongated member 128 with the relatively thick edge 168 in the reversed lower location. Also, if desired, a tapered shim plate 157 can be attached to the elongated member 130. A coiled spring 170 having arms 172 bearing against the inner surfaces of the handles 110 and 112 functions to urge the first and second jaw means 114 and 116 together. Pressure is applied to the handles 110 and 112 to move the first and second jaw means 114 and 116 apart and therefore to move the planar surfaces 132 and 144 and the planar surfaces 134 and 146 apart. A relatively thin workpiece 174 is inserted between the planar surfaces 132 and 144. If desired, an edge (not shown) of the relatively thin workpiece 174 may be positioned against a planar surface 176 of a stop member 178 secured to the elongated member 128. A relatively thick workpiece 180 in inserted between the planar surfaces 134 and 146. If desired, an edge (not shown) of the relatively thick workpiece 180 may be positioned against a planar surface 182 of a stop member 184 secured to the elongated member 130. The planar surfaces 176 and 182 lie in a common plane. The end portions 177 and 179 of the surfaces 176 and 180 are recessed so that when the clamping apparatus 2 is being used in a gluing operation, there is a space for excess glue to pass through. In the use illustrated in FIG. 6, an edge 186 of the relatively thick workpiece 180 abuts against a surface 188 of the relatively thin workpiece 174. The pivotal and linear movement of the pair of elongated spaced apart members 140 and 142 is the same as the movement of the pair of elongated spaced apart members 76 and 78 explained above.

It is understood that other means can be used to vary the angular relationship of the workpieces. One such means would include a pair of spaced apart threaded bolts on each of the members 128, 130, 140 and 142 extending out from the planar surfaces 132, 134, 144 and 146 in non-aligned locations.

In FIG. 7, there is illustrated a holding plate 190 having a generally rectangular base 192 and outwardly projecting parallel longitudinally extending flanges 194 and 196. Pairs of arcuately shaped recesses 198 and 200 and pairs of triangularly shaped recesses 202 and 204 are formed in the flanges 194 and 196. A pair of spaced apart threaded openings 206 and 208 are provided in the base 192. The holding plate 190 is used to hold shaped workpieces, such as a round rod (not shown) against a planar surface 132. A similar holding plate 190 could be used at the same time to hold a round rod against planar surface 134. In use, a holding plate 192 would be attached to the member 128 or 130 by the threaded bolts 162 and 164. A rod would be positioned between the holding plate 192 and the planar surface 132 or 134 with portions of the rod in a pair of the recesses 198 or 200. The thread bolts 162 and 164 would then be tightened to hold the rod securely in place.

Another embodiment of the clamping apparatus 2 of this invention is illustrated in FIGS. 9–12 and comprises a pair of handles 210 and 212 having a first jaw means 214 attached to the handle 210 and a second jaw means 216 attached to the handle 212. As viewed in FIG. 9, a pair of spaced apart projections 218 and 220 extends downwardly from the handle 210 and a projection 220 extends upwardly from the handle 212. Pivot means 222 pivotally connect the projections 218 and 220. Pivot means 224 pivotally connect the handle 212 to the second jaw means 216 so that movement of the handle 212 moves lever 213 connected between the handle 212 and the handle 210 which causes movement of the handle 210 and first jaw means 214 around the pivot means 222 and movement toward and away from the second jaw means 216. Handles 210 and 212 and first and second jaw means 214 and 216 have generally parallel longitudinal axes which are perpendicular to the axis of the pivot means 222 and 224.

The first jaw means 214 provide the first part of the holding means and comprise a first pair of elongated spaced apart members 226 and 228 having generally planar surfaces 230 and 232 extend outwardly in a longitudinal direction from the handle 210. The elongated spaced apart members 226 and 228 can be formed integral with the first jaw means 214 or may be secured thereto by suitable means such as by welding 234. The planar surfaces 230 and 232 are at a fixed relative angular relationship which in the embodiment illustrated in FIG. 8 is 90 degree. A 90 degree angle reinforcing bar 236 is secured to the elongated spaced apart members 226 and 228 adjacent to the free ends thereof. A 90 degree angle reinforcing bar 236 is secured to the elongated spaced apart members 226 and 228 adjacent to the free ends thereof. However, other fixed angular relationships may be utilized if desired.

Figure 9:
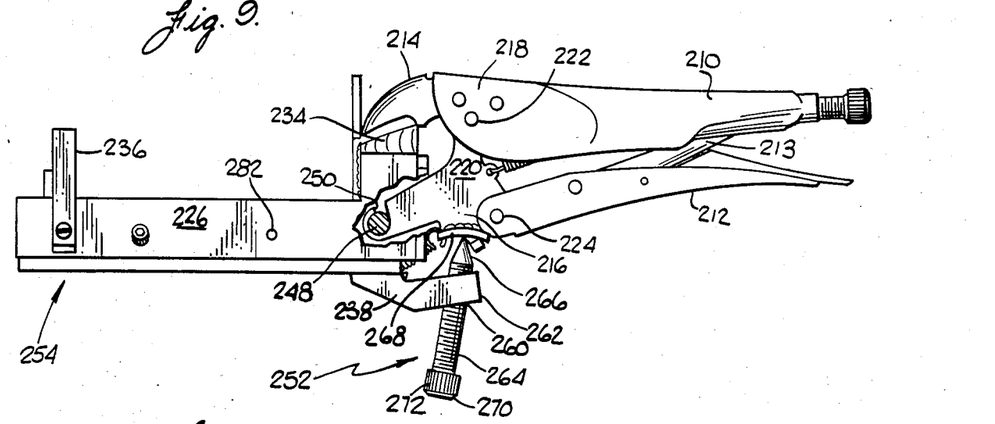
FIG. 9 is a side elevational view of another embodiment of the invention.

A second part of the holding means comprises a second pair of elongated spaced apart members 238 and 240 having generally planar surfaces 242 and 244 and have longitudinal axes generally parallel to the longitudinal axes of the elongated spaced apart members 226 and 228. A 90 degree angle reinforcing bar 246 is secured to the elongated spaced apart members 238 and 240 adjacent to the free ends thereof. A pivot rod 248 extends between the elongated spaced apart members 238 and 240 and is secured thereto by suitable means such as by welding. The pivot rod 248 passes through an opening 250 in the second jaw means 216. There is sufficient clearance between the pivot rod 248 and the opening 250 to permit rotation of the pivot rod 248 in the opening 250 and linear movement in each direction of the pivot rod 248 through the opening 250.

Figure 10:
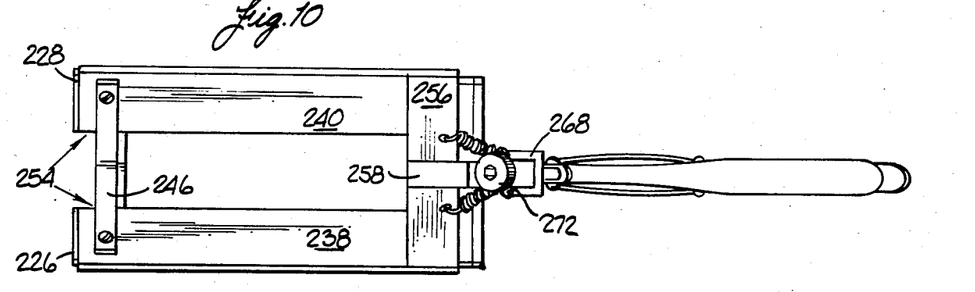
FIG. 10 is a bottom view of FIG. 9.
Figure 11:
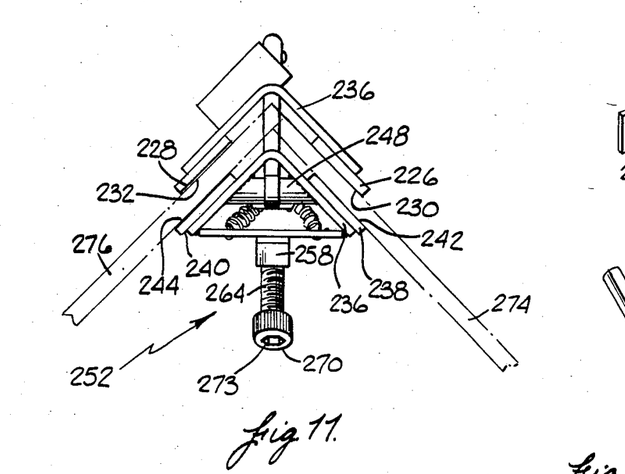
FIG. 11 is an end view of FIG. 9.

The clamping apparatus 2 of FIGS. 9–11 is provided with force applying means 252 to ensure that sufficient clamping force is being applied at areas adjacent to the free ends 254 of the elongated members 226, 228 238 and 24. A force appyling plate 256 extends between the elongated spaced apart members 238 and 240 and is secured thereto by suitable means such as by welding. A lever 258 is secured to the force applying plate 256 by suitable means such as by welding and has threaded opening 260 extending therethrough and spaced a small distance from its free end 262. A threaded bolt 264 extends through the threaded opening 260 and is in threaded engagement therewith. The threaded bolt 264 has one end 266 in engagement with a fixed bearing plate 268. The other end of the threaded bolt 264 is provided with an enlarged head 270 with a knurled surface 272 thereon. A socket 273 for receiving a wrench is also provided. Rotation of the threaded bolt 264 causes rotation of the pivot rod 248 and therefore rotation of the elongated spaced apart members 238 and 240.

One of the many uses of the clamping apparatus of FIG. 9 is illustrated in FIG. 11. The handles 210 and 212 are moved to an open position so that the planar surface 230 is spaced from the planar surface 242 and the planar surface 232 is spaced from the planar surface 244. A workpiece 274 is positioned between the planar sufaces 230 and 242 and a workpiece 276 having the same thickness as the workpiece 274 is positioned between the planar surfaces 232 and 234. The handles 210 and 212 are moved to a closed position so that the workpiece 274 is clamped between the planar surfaces 230 and 242 and the workpiece 276 is clamped between the planar surfaces 232 and 244. The threaded bolt 264 is then adjusted to ensure an equal distribution of the clamping forces between the planar surfaces 230 and 242 and the planar surfaces 232 and 244. Since the workpieces 274 and 276 have the same thickness, the center of the pivot rod 248 and the center of the opening 250 coincide.

When the clamping apparatus 2 of FIG. 9 is going to be used for purposes such as forming a T-joint between workpieces, the 90 degree reinforcing bars 236 and 246 are removed.

Figure 12:
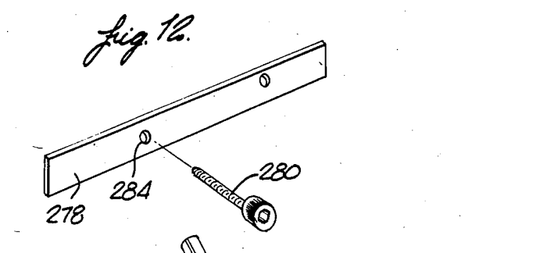
FIG. 12 is a pictorial view of a guide bar.

In FIG. 12, there is illustrated a guide bar 278 which may be secured to the elongated spaced apart members 226 or 228 by a threaded bolt 280 secured in a threaded opening 282 in the elongated spaced apart members 226 or 228 and a threaded opening 284 in the guide bar 278.

Figure 13:
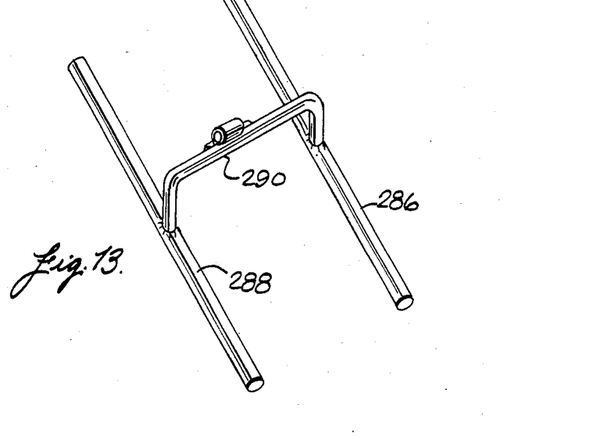
FIG. 13 is another embodiment of the invention.

In FIG. 13, there is illustrated a pair of elongated spaced aparat members 286 and 288, which have cylindrical surfaces, secured to a U-shaped member 290, similar to the U-shaped members 84 and 148. When the elongated spaced apart members 286 and 288 are used, there is no need for the pivot means 86 and 88 or 150 and 152. However, when the elongated members 286 and 288 are used, only line contact with the workpiece is obtained.

It is contemplated that the invention concepts herein described may be variously otherwise embodied and it is intended that the appended claims be construed to include alternative embodiments of the invention except insofar as limited by the prior art.

What is claimed is:

1. Clamping apparatus particularly useful in holding two workpieces of different thicknesses clamped together comprising:
  a pair of handle means;
  a first jaw means connected to one of said pair of handle means so as to have a common longitudinal axis therewith;
  second jaw means connected to the other of said pair of handle means so as to have a common longitudinal axis therewith;
  first pivot means located between said pair of handle means and said first and second jaw means for pivotally connecting said pair of handle means and said first and second jaw means for pivotal movement about a first pivot axis extending transversely to said common longitudinal axes of said pair of handle means and said first and second jaw means to permit movement of said first and second jaw means toward and away from each other and vary the angular relationship between said common longitudinal axis of said first jaw means and said one of said pair of handle means and said common longitudinal axis of said second jaw means and said other of said pair of handle means;
  first holding means attached to said first jaw means and having a pair of elongated members having surfaces having an angular relationship therebetween of less than 180 degrees, said elongated members having a longitudinal axis extending generally in a direction parallel to said common longitudinal axis of said first jaw means and said one of said handle means;
  second holding means attached to said second jaw means and comprising a bar member having a pair of elongated members attached thereto, said elongated members having surfaces and a longitudinal axis extending generally in the same direction as said longitudinal axis of said elongated members of said first holding means;
  said surfaces of said elongated members of said second holding means facing said surfaces of said elongated members of said first holding means for holding at least two workpieces therebetween;
  second pivot means connecting a portion of said second jaw means to said bar member for pivotal movement of said second holding means about a second pivot axis transverse to said longitudinal axes of said first and second holding means;
  said pivot means permitting movement of said bar member relative to said portion of said second jaw means so that said longitudinal axis of said second holding means is generally parallel to said longitudinal axis of said elongated members of said first holding means when said common longitudinal axis of said second jaw means and said other of said pair of handle means is not parallel to said common axis of said first jaw means and said one of said pair of handle means;
  slidable means mounting said bar member on said second pivot means for permitting linear sliding movement of said bar member in either direction along said second pivot means so that workpieces of different thicknesses may be held together in clamped relationship; and
  means for applying a force on said first and second jaw means to move said first and second jaw means together so that said first and second holding means will hold said workpieces of different thicknesses in said abutting angular relationship.

2. Clamping apparatus as in claim 1 wherein:
  said first holding means are fixedly secured to said first jaw means so that said longitudinal axis of said first holding means remains in fixed relationship to said common longitudinal axis of said first jaw means and said one of said pair of handle means.

3. Clamping means as in claim 2 wherein:
  said angular relationship of said surfaces of said elongated members of said first holding means is about 90 degrees.

4. Clamping apparatus as in claim 1 and further comprising:
  additional pivot means for pivotally connecting each of said elongated members of said second holding means to said bar member for pivotal movement about an axis extending generally parallel to said longitudinal axis of said elongated members on said second holding means.

5. Clamping apparatus as in claim 1 and further comprising:
  first pivotal mounting means for pivotally mounting said first holding means on said first jaw means;
  second pivotal mounting means for pivotally mounting said portion of said second jaw means on the remaining portion of said second jaw means; and
  said first and second pivotal mounting means having coinciding pivotal axes.

6. Clamping means as in claim 5 and further comprising:
  adjusting means for varying the angular relationship between said surfaces of said elongated members of said first holding means.

7. Clamping means as in claim 6 wherein said adjusting means comprises:
  a shaft mounted on each of said elongated members;
  means for mounting each of said shafts for rotation about a longitudinal axis; and means for rotating said adjusting means in an adjusted position.

8. Clamping means as in claim 7 and further comprising:
means for indicating the angular relationship between said surfaces of said elongated members of said first holding means relative to a fixed reference angle.

9. Clamping means as in claim 6 and further comprising:
locking means for locking said surfaces of said elongated members of said first holding means at a desired angular relationship.

10. Clamping apparatus as in claim 6 and further comprising:
additional pivot means for pivotally connecting each of said elongated members of said second holding means to said bar member for pivotal movement about an axis extending generally parallel to said longitudinal axis of said elongated members on said second holding means.

11. Clamping means as in claim 10 herein said adjusting means comprises:
a shaft mounted on each of said first pair of elongated members;
means for mounting each of said shafts for rotation about a longitudinal axis; and
means for retaining said adjusting means in an adjusted position.

12. Clamping apparatus as in claim 11 and further comprising:
means for indicating the angular relationship between said surfaces of said elongated members of said first holding means relative to a fixed reference angle; and
locking means for locking said surfaces of said elongated members of said first holding means at a desired angular relationship.

13. Clamping means as in claim 1 and further comprising:
means for applying a force on said second holding means in a direction to move said second holding means around said second pivot axis to ensure said generally parallel relationship between said longitudinal axes of said elongated members of said first and second holding means.

14. Clamping means as in claim 13 wherein said means for applying a force comprises:
plate means secured to said elongated members of said second holding means;
a lever arm extending axially outwardly from said plate means;
a threaded bolt threadedly mounted in said lever arm; and
a bearing plate on said second jaw means and located so that one end of said bolt is in contact with said bearing plate so that rotation of said bolt rotates said elongated members of said second holding means around said second pivot means.

15. Clamping apparatus as in claim 1 and further comprising:
guide means pivotally mounted on said surfaces of said elongated members of said first holding means so that an edge of a workpiece may be positioned at a desired angular relationship to the longitudinal axis of said first pair of elongated spaced apart members; and
means for retaining said guide means at said desired angular relationship.

16. Clamping apparatus as in claim 1 and further comprising:
said first and second holding means holding said two workpieces so that the juncture of said two workpieces is unobstructed.

17. Clamping apparatus as in claim 1 wherein:
each of said surfaces of said elongated members of said first and second holding means is generally planar.

18. Clamping apparatus as in claim 1 and further comprising:
adjusting means for varying the angular relationship between said relatively planar surfaces of said elongated members of said first holding means.

19. Clamping apparatus as in claim 18 wherein said adjusting means comprises:
a plurality of elongated angle plates having opposite planar surfaces having a transversely tapered relationship; and
means for securing one of said elongated angle plates to at least one of said planar surfaces of said elongated members of said first holding means to vary said angular relationship therebetween.

20. Clamping apparatus as in claim 18 wherein:
said adjusting means comprises at least one pair of adjustable set screws mounted on at least on of said elongated members of said first holding means to vary said angular relationship.

* * * * *

UNITED STATES PATENT AND TRADEMARK OFFICE
CERTIFICATE OF CORRECTION

PATENT NO. : 4,696,460

DATED : September 29, 1987

INVENTOR(S) : Eugene P. Genereaux; Samuel M. Jameson; Timothy K. Brooks

It is certified that error appears in the above-identified patent and that said Letters Patent are hereby corrected as shown below:

```
Col.  1, line 52   delete "togeher" and insert therefor --together--
Col.  3, line 37   before "plate insert --base--
Col.  3, line 51   before "members" insert --apart--
Col.  5, line  8   delete "332" and insert therefor --32--
Col.  6, line  8   delete "fist" and insert therefor --first--
Col.  7, line 32   delete "7" and insert therefor --8--
Col.  8, line 60   delete "sufaces" and insert --surfaces--
Col.11, line  1   delete "rotating" and insert therefor
                   --retaining--
```

Signed and Sealed this

Second Day of February, 1988

Attest:

DONALD J. QUIGG

Attesting Officer

Commissioner of Patents and Trademarks